United States Patent
Bright et al.

(10) Patent No.: US 6,855,275 B1
(45) Date of Patent: *Feb. 15, 2005

(54) VISCOSITY MODIFICATION OF HIGH VISCOSITY FLAME RETARDANTS

(75) Inventors: Danielle A. Bright, New City, NY (US); Alan M. Aaronson, Fresh Meadows, NY (US); Ronald L. Pirrelli, Hartsdale, NY (US)

(73) Assignee: Ripplewood Phosphorus U.S. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/711,134

(22) Filed: Sep. 9, 1996

Related U.S. Application Data

(63) Continuation of application No. 08/322,879, filed on Oct. 13, 1994, now abandoned, which is a continuation-in-part of application No. 07/436,285, filed on Nov. 14, 1989, now abandoned.

(51) Int. Cl.[7] .......................... C09K 21/12; C09K 21/14
(52) U.S. Cl. ........................ 252/609; 252/601; 521/107
(58) Field of Search ................................ 252/601, 602, 252/603, 604, 605, 606, 607, 608, 609; 558/164; 521/107

(56) References Cited

U.S. PATENT DOCUMENTS

| | | | |
|---|---|---|---|
| 3,869,526 A | * | 3/1975 | Combey et al. |
| 4,032,498 A | * | 6/1977 | Dany et al. |
| 4,433,071 A | * | 2/1984 | Fesman |
| 4,565,833 A | * | 1/1986 | Buszard et al. |
| 4,681,902 A | * | 7/1987 | Duncan et al. |
| 4,746,682 A | | 5/1988 | Green ..................... 521/107 |
| 4,892,892 A | * | 1/1990 | Favstritsky et al. |
| 5,041,596 A | | 8/1991 | Bright et al. ............. 558/91 |
| 5,086,082 A | * | 2/1992 | Stone |
| 5,547,614 A | * | 8/1996 | Fesman et al. ........... 252/609 |

FOREIGN PATENT DOCUMENTS

| | | | |
|---|---|---|---|
| JP | 4034274 | * | 4/1974 |

* cited by examiner

*Primary Examiner*—Joseph D. Anthony
(74) *Attorney, Agent, or Firm*—Dilworth & Barrese LLP

(57) ABSTRACT

Alkylene-bridged diphosphate compounds can be used to modify, namely, reduce, the viscosity of fluid flame retardants (polybrominated aryl oxides, oligomeric phosphate esters, etc.) which are useful in flame retarding polyurethane and thermoplastic compositions.

3 Claims, No Drawings

VISCOSITY MODIFICATION OF HIGH VISCOSITY FLAME RETARDANTS

This application is a continuation of Ser. No. 08/322,879 filed Oct. 13, 1994 now abandoned, which is a continuation-in-part of Ser. No. 07/436,285 filed Nov. 14, 1989 now abandoned.

BACKGROUND OF THE INVENTION

Polyurethane foams, engineering thermoplastics coatings and elastomers are commonly admixed with flame retardants to achieve the desired degree of flame retardancy for the final material desired. Pumpable fluid (or liquid) flame retardant compositions are a preferred class since such pumpable formulations are needed in environments where automation and machine mixing of the various components are used. Examples of the chemical classes for such fluid or liquid flame retardants include brominated aryl flame retardants, such as polybromodiphenyl oxide, and various viscous organophosphorus flame retardants such as the oligomeric phosphate esters, such as the chlorinated oligomeric phosphate esters (e.g. FYROL 99 brand) and the reaction product of 2-chloro-1-propanol phosphate (3:1) with ethylene oxide and phosphorus pentoxide (FYROL PCF brand), and the aromatic oligomeric phosphate esters such as those containing an arylene bridging group derived from a diol such as bisphenol A, hydroquinone or resorcinol.

High viscosity in such fluid or liquid flame retardant compositions can be disadvantageous since it makes the pumping and movement of such compositions more difficult thereby complicating manufacturing operations. It can also hinder the flow of thermoplastic polymers containing such a viscous flame retardant. For example, it is known that polybrominated diphenyl oxide flame retardants are very viscous. U.S. Pat. No. 4,746,682 to J. Green indicates that either alkyl diphenyl phosphates or alkylated triaryl phosphates can be used to achieve blends having acceptably low viscosity as compared to the polybrominated aryl flame retardant itself. Copending U.S. Ser. No. 215,406, filed Mar. 14, 1994, describes the use of triphenyl phosphate as a viscosity reduction additive for viscous flame retardants. However, the relatively low volatility of the triaryl phosphates makes them unsuitable for certain applications where high processing temperatures may cause juicing.

SUMMARY OF THE INVENTION

It has now been found that an alkylene-bridged diphosphate compound is an effective viscosity modifying, namely, reducing agent in the aforementioned types of liquid, but viscous, flame retardant compositions. This type of material is less volatile than a triaryl phosphate compound. It also has a higher phosphorus content resulting in an increased flame retardancy efficacy as compared to a triaryl phosphate compound.

DESCRIPTION OF THE PREFERRED EMBODIMENT

The terminology "alkylene-bridged diphosphate compound" is to be understood to encompass monomeric and low oligomeric species of the formula

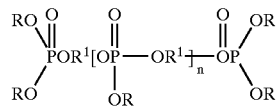

Where R is aryl, such as unsubstituted phenyl, n is a number ranging from 0 to about 5, and $R^1$ is alkylene of from 1 to 8 carbon atoms.

The level of use of the diphosphate viscosity modification additive of the present invention with a particular flame retardant will depend upon its initial compatibility or miscibility with the flame retardant component whose viscosity is initially high and in need of reduction. The level of diphosphate to use is also dependent upon the ultimate viscosity that is desired for the composition containing it. Generally, the amount of diphosphate that needs to be added will range from about 5% to about 80%, by weight of the fluid or liquid flame retardant whose viscosity is to be reduced, preferably from about 5% to about 50%, more preferably from about 5% to about 30%.

The liquid flame retardants to which the instant invention can be added include polybrominated diphenyl oxide and aromatic oligomeric phosphates (e.g., resorcinol bis (diphenyl phosphate), bisphenol A bis(diphenyl phosphate), poly(resorcinol phenylphosphate), and high molecular weight chloroalkyl phosphates.

The aromatic bisphosphates to which the above-described alkylene-bridged diphosphate species can be added are of the same formula given above with the exception that $R^1$ is derived from an arylene diol, such as resorcinol, bisphenol A, or hydroquinone, and n is generally from 0 to about 15. The diphosphate viscosity reducing additive of the instant invention can also be used in similar amount with flame retardant compositions which contain oligomeric phosphate esters as the sole or predominant component. Generally speaking, it has been found that up to about 50%, by weight of the alkylene-bridged diphosphate compound, based on the weight of the entire composition, can be used in such systems in preferred embodiments.

The instant invention allows for the obtaining of low enough viscosities to achieve pumpable flame retardant compositions which are required to satisfactorily process flexible and rigid polyurethane foams, for example. Easier machine mixing and miscibility are achieved by bringing the viscosities of the components closer and preferably lower. Coating and elastomers also require low viscosities for better flowability and processing.

The present invention is illustrated by the Examples which follow.

EXAMPLES

A series of compositions were tested in regard to their viscosity at 23° C.±0.5° C. in a Brookfield viscometer. The Table given below shows the results which were obtained. (The viscosity of the additives responsible for viscosity reduction were as follows: neopentyl glycol bis (diphenylphosphate)-549; ethylene glycol bis (diphenylphosphate)-319; and propylene glycol bis (diphenylphosphate)-367.5.

TABLE

| Composition - Amount (wt %) | | Viscosity (cps) |
|---|---|---|
| Bisphenol A bis(diphenyl phosphate) | 100% | 20,900 |
| Bisphenol A bis(diphenylphosphate) | 90% | |
| Neopentyl glycol bis(diphenylphosphate) | 10% | 12,000 |
| Bisphenol A bis(diphenylphosphate) | 80% | |
| Neopentyl glycol bis(diphenylphosphate) | 20% | 8,292 |
| Bisphenol A bis(diphenylphosphate) | 50% | |
| Neopentyl glycol bis(diphenylphosphate) | 50% | 2,616 |
| Bisphenol A bis(diphenylphosphate) | 90% | |
| Ethylene glycol bis(diphenylphosphate) | 10% | 11,700 |
| Bisphenol A bis(diphenylphosphate) | 80% | |
| Ethylene glycol bis(diphenylphosphate) | 20% | 6,548 |
| Bisphenol A bis(diphenylphosphate) | 50% | |
| Ethylene glycol bis(diphenylphosphate) | 50% | 1,752 |
| Bisphenol A bis(diphenylphosphate) | 80% | |
| Propylene glycol bis(diphenylphosphate) | 20% | 7,380 |
| Bisphenol A bis(diphenylphosphate) | 50% | |
| Propylene glycol bis(diphenylphosphate) | 50% | 2,052 |
| Resorcinol bis(diphenyl phosphate) | 100% | 691 |
| Resorcinol A bis(diphenylphosphate) | 90% | |
| Neopentyl glycol bis(diphenylphosphate) | 10% | 670.5 |
| Resorcinol A bis(diphenylphosphate) | 90% | |
| Ethylene glycol bis(diphenylphosphate) | 10% | 636 |
| Resorcinol A bis(diphenylphosphate) | 90% | |
| Propylene glycol bis(diphenylphosphate) | 10% | 666 |
| Pentabromo Diphenyloxide | 70% | |
| Neopentyl glycol bis(diphenylphosphate) | 30% | 8,670 |
| Pentabromo Diphenyloxide | 50% | |
| Neopentyl glycol bis(diphenylphosphate) | 50% | 2,090 |
| Pentabromo Diphenyloxide | 70% | |
| Ethylene glycol bis(diphenylphosphate) | 30% | 5,090 |
| Pentabromo Diphenyloxide | 50% | |
| Ethylene glycol bis(diphenylphosphate) | 50% | 1,225 |
| Pentabromo Diphenyloxide | 70% | |
| Propylene glycol bis(diphenylphosphate) | 30% | 5,590 |
| Pentabromo Diphenyloxide | 50% | |
| Propylene glycol bis(diphenylphosphate) | 50% | 1,395 |

The foregoing data is presented for purposes of illustrating certain embodiments of the present invention and, for that reason, should not be construed in a limiting sense. The scope of protection sought is set forth in the claims which follow.

We claim:

1. A flame retardant composition suitable for use in forming a flame retardant polymer composition which fluid flame retardant composition consists essentially of a normally viscous fluid flame retardant selected from the group consisting of an aromatic oligomeric phosphate ester and a high molecular weight chloroalkyl phosphate and an effective amount of a fluid alkylene-bridge diphosphate compound for viscosity reduction thereof; wherein said alkylene-bridge diphosphate compound is of the formula

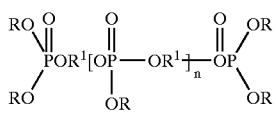

wherein R is aryl; n is a number ranging from 0 to about 5; and $R^1$ is alkylene of from 1 to 8 carbon atoms, and wherein said effective amount of a fluid alkylene-bridge diphosphate compound is from about 5% by weight to about 80% by weight of said normally viscous fluid flame retardant whose viscosity is to be reduced.

2. A composition as claimed in claim 1 wherein the alkylene-bridged diphosphate is present at up to about 50%, by weight of the entire composition.

3. A composition as claimed in claim 1 wherein the alkylene-bridged diphosphate is present at up to about 30%, by weight of the entire composition.

* * * * *